US006844882B1

(12) United States Patent
Clauson

(10) Patent No.: US 6,844,882 B1
(45) Date of Patent: Jan. 18, 2005

(54) VARIABLE DITHERING FOR GIF

(75) Inventor: Jon D. Clauson, Maple Grove, MN (US)

(73) Assignee: Adobe Systems Incorporated, San Jose, CA (US)

( * ) Notice: Subject to any disclaimer, the term of this patent is extended or adjusted under 35 U.S.C. 154(b) by 330 days.

(21) Appl. No.: 09/736,627

(22) Filed: Dec. 13, 2000

(51) Int. Cl.[7] ............................. G09G 5/02; G09G 5/00
(52) U.S. Cl. ....................... 345/596; 345/600; 345/616
(58) Field of Search ................................ 345/596, 600, 345/616; 348/574; 358/3.13–3.19

(56) References Cited

U.S. PATENT DOCUMENTS

| 5,455,600 | A |   | 10/1995 | Friedman et al. ........... 345/153 |
| 5,611,027 | A | * | 3/1997 | Edgar ........................ 345/853 |
| 6,288,795 | B1 | * | 9/2001 | Urasawa .................... 358/3.09 |

OTHER PUBLICATIONS

Foley et al., Computer Graphics: Principles and Practice, 1997, Addison–Wesley, Second edition, pp. 835–840 and 843–844.*
Pruitt et al., Sams Teach Yourself GIMP in 24 Hours, 1999, Sams, pp. 1–2.*
Foley et al, Computer Graphics: Principles and Practice, 1997, Addison–Wesley, Second Edition, pp. 835–840 and 843–844.*
Wilson et al., HVS ColorGIF 2.0 User Manual, Jul. 23, 1997, http://www.digfrontiers.com/color2docs/contents.html.*
Digital Image Processing Laboratory: Image Halftoning, Purdue University (Apr. 19, 2000).

(List continued on next page.)

Primary Examiner—Mark Zimmerman
Assistant Examiner—Scott Wallace
(74) Attorney, Agent, or Firm—Fish & Richardson P.C.

(57) ABSTRACT

A method for generating a palette-based output image from a source image by variably dithering regions of the source image using an associated regional dithering mask. The palletized output image can be a GIF image or a PNG8 image. The dithering mask contains a plurality of dithering levels specifying the degree to which colors in corresponding regions of the source image can be dithered to paint the output image. The dithering mask stores dithering levels for the source image on a per pixel basis. The dithering mask is stored as an alpha channel of the source image. The palletized output file is generated from the source image on a per pixel basis. For each pixel, a target color is calculated by adding an accumulated error from neighboring pixels to the true color of a corresponding pixel in the source image. The output pixel is painted with the closest color to the target color that is available in the output file's color table. A color error is calculated by subtracting the output pixel's paint color from it's target color, and multiplying the difference by a dithering level obtained from a corresponding pixel in a dithering mask. The color error is diffused to neighboring pixels according to a dithering algorithm, such as the Floyd-Steinberg dithering algorithm.

8 Claims, 3 Drawing Sheets

OTHER PUBLICATIONS

Jeffrey B. Mulligan, *Methods for Spatiotemporal Dithering*, NASA Ames Research Center (n.d.).

*Optimizing Web Graphic: Introduction* (created Jun. 10, 1996, revised: Sep. 1, 2000), at http://www.webreference.com/graphics/intro.html (last visited Feb. 2, 2004).

*Optimizing Web Graphics: Color Reduction* (created Jun. 10, 1996, revised: Feb. 23, 2000), at http://www.webreference.com/dev/graphics/reduce.html (last visited Feb. 2, 2004).

*A Guide to Web Image Compression Software: HVS ColorGIF*, at http://www.home.aone.net.au/byzantium/graphics/digcgif2.html (last visited Feb. 2, 2004).

Susan Kuchinskas, *Speeding Web Graphics*, (Nov. 12, 1997), at http://www.wired.com/news/technology/0,1282,8502,00.html (last visited Feb. 2, 2004).

"Adobe Photoshop Tips", 1999 DGS (http://www.thedesktop.com/tip01.html).

* cited by examiner

VARIABLE DITHERING FOR GIF

BACKGROUND

The invention relates to creating an electronic image in a palette based file format in which the image's colors are stored in a look-up table or color palette in the output image file. Common examples of palette based file formats are the Graphical Interchange Format (GIF) and the 8-bit Portable Network Graphics format (PNG8).

Electronic images are often transmitted from one user to another. The speed of transmission depends in part on the size of the image being transmitted, and can be reduced by reducing the image's size. One way to reduce an image's size is to reduce the number of colors used to paint the image. For example, an image painted with 24-bit (true) color and containing millions of colors can be reduced by converting it to a palette-based output file containing only a small fraction of the source image's true colors. To generate the palette-based output file, every color in the source image is mapped to a nearest color that is available in the palletized file's color palette. Since the color palette typically contains only 256 unique colors, much of the color information in the source image is lost when converting it to a palette-based output file.

To partially compensate for this loss in color fidelity, applications converting images to a palette-based file format frequently simulate colors which are not available in the output image's color palette using a process called dithering. Dithering simulates the colors which are not available in the output image's color palette by creating pixel patterns of related colors which are available. These pixel patterns are blended in the mind of an observer, and create the illusion of seeing many of the unavailable colors. Various methods of dithering are known. For example, the error diffusion method operates by painting each pixel in the output image with a paint color available in that image's color palette that is nearest to a target color. The target color is the sum of the true color of a corresponding pixel in the source image and a diffusive color error obtained from one or more previous pixels in the converted output image, where the diffusive color error is a measure of the difference between the paint and target colors in previous pixels in the converted output image.

Another way of reducing an image's size (in addition to palletizing it) is to compress the image using one of a number of known compression algorithms. The algorithm typically used to compress palletized color images is the Lempel-Ziv-Welch (LZW) compression algorithm. The LZW algorithm works by finding repetitive sequences in the source image, storing the repetitive sequences in a compression table with smaller identifying code words, and writing the identifying code words and the compression table to the compressed output file. The LZW compression algorithm works best (compresses most) when the source file contains long repetitive sequences. For example, the LZW compression algorithm works best with color images that contain regions of pixels having the same color.

When a color image is converted to a palette-based file format without dithering, whole regions of the image are often mapped to the same color palette color, because the color variation among pixels in a given region is often smaller than the color difference between neighboring colors in the color palette. Thus, color images which are converted to palette-based images without dithering can often be significantly compressed by the LZW compression algorithm. Conversely, when a color image is dithered while being converted to a palette-based file format, nearly every pixel in the converted image contains a different color table color because of the color error diffusion introduced by the dithering algorithm. As a result, color images converted to palette-based images while being dithered are much less compressible than color images converted to palette-based images without being dithered.

SUMMARY

The invention discloses a method for generating a palette-based output image from a source image by variably dithering regions of the source image using an associated regional dithering mask. The palletized output image can be a GIF image or a PNG8 image. The dithering mask contains a plurality of dithering levels specifying the degree to which colors in corresponding regions of the source image can be dithered to paint the output image. The dithering mask can store dithering levels for the source image on a per pixel basis. The dithering mask can be stored as an alpha channel of the source image, or as a separate file associated with the source image.

The palletized output file is generated from the source image on a per pixel basis. For each pixel in the output file image, a target color is calculated by adding an accumulated error from previously painted pixels in the output image to the true color of a corresponding pixel in the source image. For the initial output file pixel, the accumulated color error is zero. The target color is used to search the output file color table for a nearest matching color, and the pixel is painted with the nearest matching color. The pixel's color error is calculated by subtracting it's paint color from it's target color, and multiplying the difference by a dithering level obtained from a corresponding pixel in a dithering mask. The pixel's color error is diffused to neighboring pixels according to a dithering algorithm. In one implementation, each pixel's color error is diffused to neighboring pixels according to the Floyd-Steinberg dithering algorithm.

Advantages of the invention include the following. The invention allows a user to optimize the competing interests of maintaining color fidelity and minimizing file size when converting a source image to a palette-based file format. The user can specify variable dithering levels for the source image on a regional basis so that regions of the source image where color fidelity is more important can be more heavily dithered than regions of the source image where color fidelity is less important. The regions of the source image where color fidelity is more important will be heavily dithered, and will consequently contain more information and be less compressible. The regions of the source image where color fidelity is less important will be less heavily dithered, and will consequently contain less information and will be more compressible.

The details of one or more embodiments of the invention are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION

Images often contain different regions having different color fidelity requirements. For example, portraits have recognizable background and foreground regions. The background regions generally contain colors which are of little interest to a viewer, and which need not be faithfully reproduced. Conversely, the foreground regions generally contain colors which are of great interest to a viewer, and which need to be reproduced as faithfully as possible.

Figure 1:
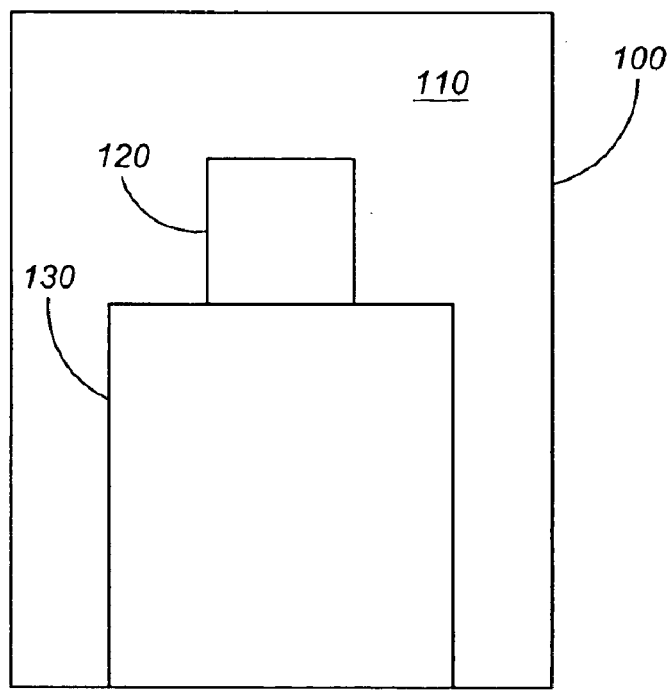
FIG. 1 is a schematic illustration of an image having a plurality of regions with different color fidelity requirements.

FIG. 1 is a schematic illustration of an electronic portrait image 100 made with 16-bit color, having a background region 110, and a foreground region consisting of a face region 120, and a torso region 130. The color of background region 110 may, for example, be neither particularly interesting, nor important to conveying the information content of image 100. For example, the color of background region 10 might be the color of a light blue, light green, or cream colored backdrop cloth, whose particular shade is not important to anyone who may wish to view electronic portrait 100. Conversely, the colors in the face region 120 and torso region 130 of portrait 100 will be of great interest to those who may want to view the image.

Electronic image 100 may reside on the computer hard drive of its owner. The owner may wish to send image 100 to a viewer at a remote location, for example by emailing it to him or her. To minimize the time it takes to send and receive image 100, the owner may wish to first convert it into a GIF or PNG8 palette-based file. Unfortunately, the conversion of image 100 to a GIF or PNG8 palette-based file will result in a loss of color fidelity. The expected color fidelity loss can be partially overcome by dithering the colors in the GIF or PNG8 output file. However, the more the GIF or PNG8 output file is dithered, the less compressible the GIF of PNG8 file will become. Since image 100 has different regions with different color fidelity requirements, different regions of the image can be dithered to different levels to optimize the competing interests of maximizing both the color fidelity of the converted image, and its compressibility.

Figure 2:
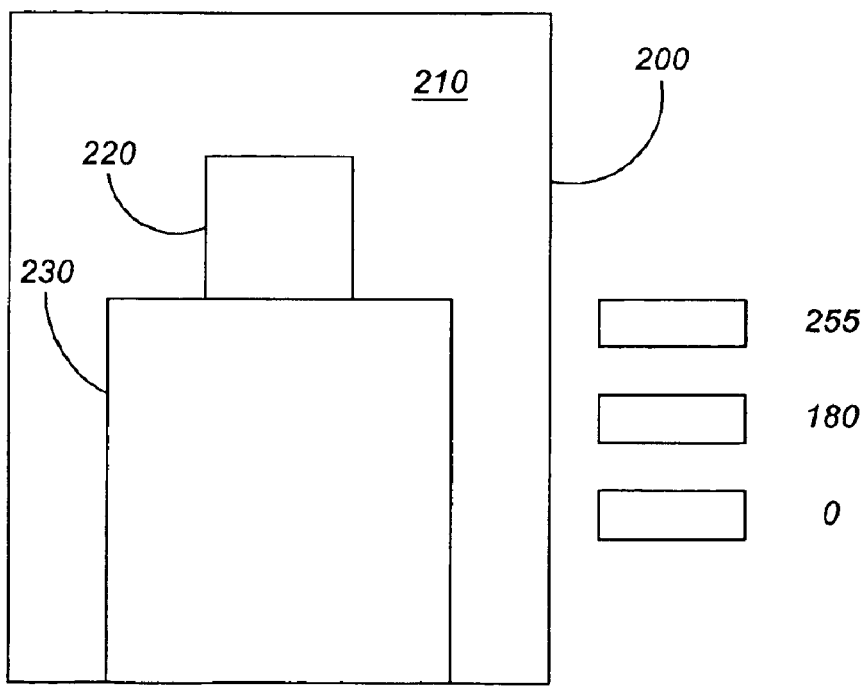
FIG. 2 is a schematic illustration of a dithering mask associated with an image having regions with different color fidelity requirements.

As shown in FIG. 2, to variably dither the conversion of image 100 to GIF or PNG8 format, a dithering mask 200 corresponding to source image 100 is created. The pixels in dithering mask 200 can have a one-to-one correspondence with the pixels in source image 100. Dithering mask 200 can be created and stored as an alpha channel of image 100, i.e., dithering mask 200 can be created as a part of image 100 and stored in the same file as the image. Alternatively, dithering mask 200 can be created and stored in a separate file from image 100, such that the two files are linked together by an operating system, a database, or through an image generating application. Dithering mask 200 is created with dithering regions 210, 220, and 230, corresponding to regions 110, 120, and 130 of source image 100, respectively. Dithering mask 200 contains a plurality of dithering levels specifying the degree to which the GIF or PNG8 image generating application will simulate the colors in source image 100 by dithering. For example, dithering mask 200 can contain different dithering levels in regions 210, 220, and 230 specifying the different degrees to which the GIF generating application will simulate the colors in regions 110, 120, and 130 of corresponding source image 100 which are not available in the output GIF file's color table.

Dithering mask 200 can be automatically created when image 100 is created. Alternatively, dithering mask 200 can be created independently of image 100. Dithering mask 200 can be created by hand, e.g., by painting the variable dithering regions in the dithering mask, by inputting dithering levels on a per pixel basis, or by inputting dithering levels within a selected dithering region. Dithering mask 200 can be stored as a pixel array. Each pixel in the array can be represented as an 8-bit word, allowing dithering mask 200 to specify 256 discrete dithering levels, and to control the amount of color error diffusion to each pixel in the GIF conversion of image 100 from 0% to 100% in increments of approximately 0.4%.

Figure 3:
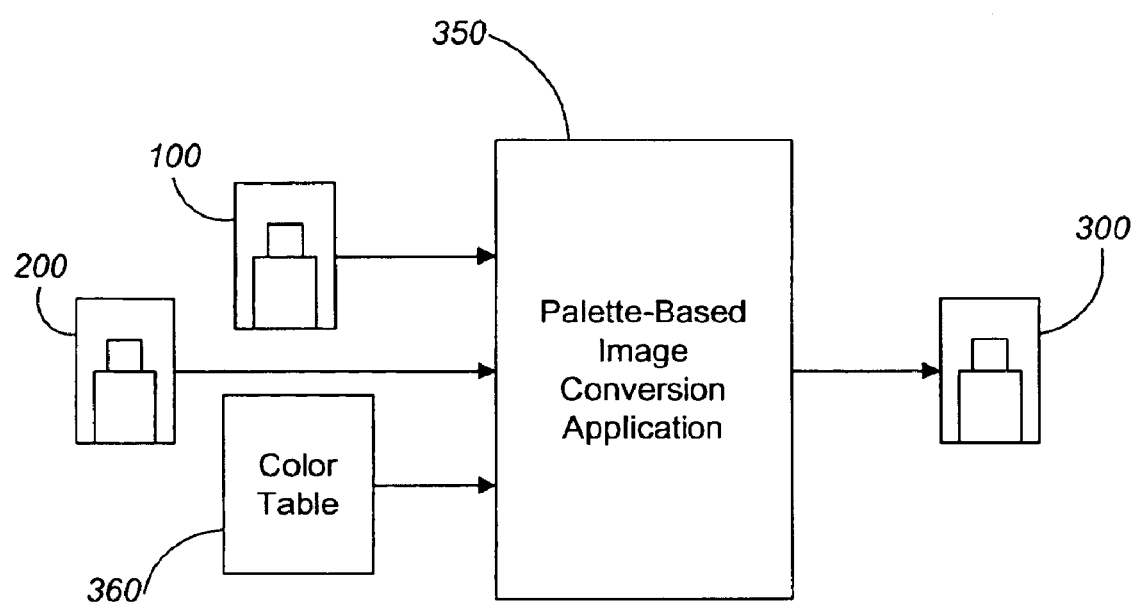
FIG. 3 is a schematic illustration of an application capable of creating an image file from an image having regions with different color fidelity requirements.

FIG. 3 shows the inputs and outputs to an image conversion application 350 that is capable of converting source image 100 to a variably dithered, palette-based conversion image 300, using variable dithering mask 200 and the limited colors available in color table 360. Converted palette-based image 300 has variably dithered regions 310, 320, and 330, corresponding to regions 110, 120, and 130, respectively, of source region 100, and to regions 210, 220, and 230, respectively, of dithering mask 200. Image conversion application 350 receives as input image 100, corresponding dithering mask 200, and color table 360. Alternatively, image conversion application 350 receives as input image 100 and dithering mask 200, and creates color table 360 from the colors in image 100. Image conversion application 350 produces converted, palette based image 300, using the regional dithering levels specified in dithering mask 200 to regionally simulate the colors in image 100 that are not available in color table 360 by dithering.

The amount of dithering applied to the colors in region 310 of converted image 300, is controlled by the dithering level specified in region 210 of dithering mask 200. For example, if the colors in background region 110 of source image 100 are of little interest to a viewer of image 100, dithering region 210 of dithering mask 200 can specify a dithering level of 0. In that case, image conversion application 350 will apply 0% dithering to region 310 of converted image 300, i.e., image conversion application 350 will not dither the palette colors used to paint region 310 of converted image 300. Instead, image conversion application 350 will paint each pixel in region 310 of converted image 300 with the color in palette 360 that is closest in color to the color of the corresponding pixel in image 100.

The amount of dithering applied to the colors in regions 320 and 330 of converted image 300 is similarly controlled by the dithering level specified in corresponding dithering regions 220 and 230 of dithering mask 200. For example, if the colors in the foreground region 120 of image 100 are of great interest, dithering region 220 of dithering mask 200 can specify a dithering level of 255. In that case, image conversion application 350 will apply 100% dithering to the colors in region 320 of converted image 300. That is, image a conversion application 350 will diffuse to subsequent pixels in converted image 300, 100% of the color error resulting from painting a pixel in region 320 of converted image 300 with a nearest matching color chosen from palette 360 rather than with the true color from the corresponding pixel in image 100.

Similarly, if the colors in region 130 of image 100 are of moderate interest, more interesting than the colors in region 110 but less interesting than the colors in region 120, dithering region 230 can specify a dithering level of 180. In that case, image conversion application 350 will apply 71% dithering ($180/255$) to the colors in region 330 of converted image 300. Thus, by varying the dithering levels in regions 210, 220, and 230 of dithering mask 200, a user can control the amount of dithering applied to the colors in regions 310, 320, and 330 of converted image 300 when converting image 100 to a palette based image file. A user can alter the amount of dithering applied to the colors of converted image 300 on a pixel by pixel basis by specifying per pixel dithering levels in dithering mask 200.

Figure 4:
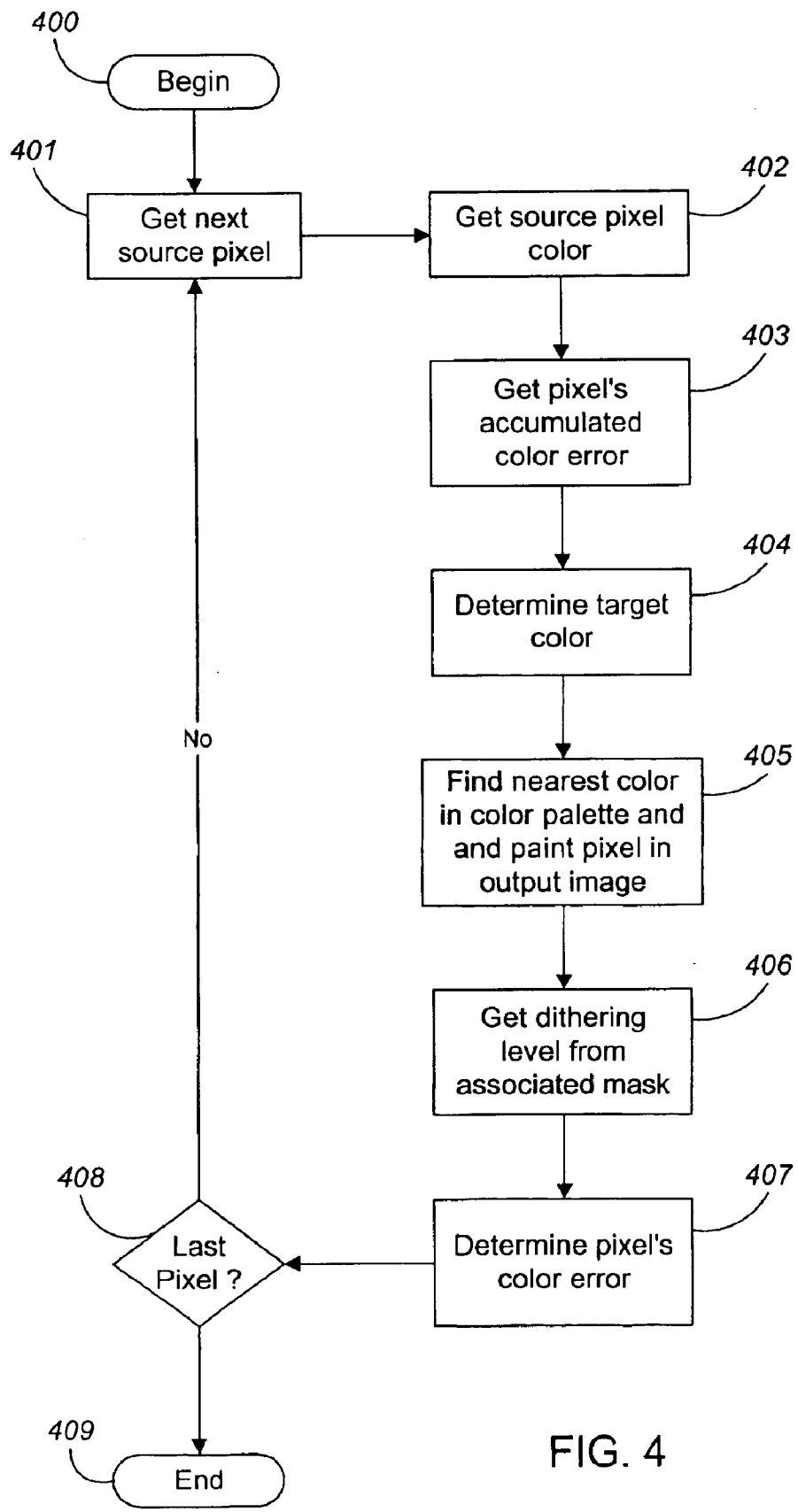
FIG. 4 is a flowchart depicting a method by which an application can create an image file from an image having regions with different color fidelity requirements.

FIG. 4 depicts a flow chart of an application that can variably dither palette based conversion image 300 given a source image 100, a dithering mask 200, and a color palette 360. As shown in FIG. 4, image generating application 350 loops through each pixel in source image 100 (steps 401–408); determines the pixel color from source image 100 (step 402); determines the accumulated color error from previously painted pixels in converted image 300 according to a dithering algorithm (step 403); determines a target color (step 404); finds the nearest available color in color palette 360 and paints the corresponding pixel in converted image 300 with that color (step 405); determines a dithering level or color error diffusion level from a corresponding pixel in dithering mask 200 (step 406); and computes the converted pixel's color error from the true color of its corresponding pixel in image 100, the color in palette 360 used to paint the pixel in image 300, and the dithering level from dithering mask 200. Once a converted pixel's color error is computed, image generating application 350 checks whether all pixels in image 100 have been processed (step 408), and either exits if all pixels have been processed (step 409), or selects the next pixel to process (step 401).

When the color error for a pixel in converted image 300 is computed by image generating application 350 (step 407), the error is diffused to neighboring pixels in image 300 according to any of a number of known dithering algorithms. For example, in the Floyd-Steinberg dithering algorithm, $7/16$ of a pixel's color error is diffused to the pixel to its immediate right, while $3/16$ of the color error is diffused to the pixel immediately below and to the left, $5/16$ is diffused to the pixel immediately below, and $1/16$ is diffused to the pixel immediately below and to the right. Similarly, when the accumulated color error from previous pixel's in converted image 300 is attributed to a current pixel in the image (step 403), the accumulated color error is obtained by adding up the color errors diffused to the current pixel from previous pixels according to the diffusive dithering algorithm. Thus, in the Floyd-Steinberg algorithm, $7/16$ of the color error diffused to a current pixel comes from the color error of the pixel to its immediate left, while $1/16$ comes from the pixel immediately above it and to the left, $5/16$ comes from the pixel immediately above it, and $3/16$ comes from the pixel immediately above it and to the right.

The target color for a pixel in converted image 300 (step 404) is taken to be the sum of the corresponding pixel color in source image 100 (step 402), and the accumulated color error from previous pixels (step 403). The color error for a pixel in converted image 300 (step 407) is taken to be a percentage of the difference between the color from palette 360 used to paint the pixel (step 405), and the pixel's target color (step 404), where the percentage is specified by the dithering level specified in dithering mask 200 (step 407).

The invention can be implemented in digital electronic circuitry, or in computer hardware, firmware, software, or in combinations of them. Apparatus of the invention can be implemented in a computer program product tangibly embodied in a machine-readable storage device for execution by a programmable processor; and method steps of the invention can be performed by a programmable processor executing a program of instructions to perform functions of the invention by operating on input data and generating output. The invention can be implemented advantageously in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors. Generally, a processor will receive instructions and data from a read-only memory and/or a random access memory. Generally, a computer will include one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits).

To provide for interaction with a user, the invention can be implemented on a computer system having a display device such as a monitor or LCD screen for displaying information to the user and a keyboard and a pointing device such as a mouse or a trackball by which the user can provide input to the computer system. The computer system can be programmed to provide a graphical user interface through which computer programs interact with users.

A number of embodiments of the invention have been described. Nevertheless, it will be understood that various modifications may be made without departing from the spirit and scope of the invention. For example, while the application has been described wherein image 100 is portrait image made with 24-bit color and having only 3 regions of interest, image 100 can be any type of image, painted with an arbitrary color resolution, and can have any number of regions of variable interest. In particular, dithering mask 200 can specify a separate dithering level for each pixel in image 100. Similarly, while dithering mask 200 has been described as an array of 8-bit words, the mask can be stored as an array of arbitrarily sized words. For example, the mask could be stored as an array of 16-bit words with each array element specifying 65,536 discrete dithering levels.

Similarly, while the invention has been described in terms of converting image 100 to a GIF or PNG8 image, the invention can be used in any application which converts an image file to any palette-based file format, of which GIF and PNG8 are common examples. The invention can also be used with any image viewing application, allowing a viewer of an image to regionally specify the amount of dithering he or she desires to be applied to the colors of the image file being viewed.

Accordingly, other embodiments are within the scope of the following claims.

What is claimed is:

1. A method for generating an output image from a source image, wherein the colors of the output image are generated from a limited color palette, comprising:

receiving a true color for a pixel in the output image from a corresponding pixel in the source image;

receiving an accumulated color error for the pixel in the output image from a plurality of neighboring pixels;

calculating a target color for the output image pixel from the true color and the accumulated color error;

finding a paint color in the limited color palette, wherein the paint color is the color in the limited color palette that is closest to the target color;

painting the pixel in the output image with the paint color;

receiving a dithering level from a corresponding pixel in a dithering mask associated with the source image, wherein the dithering level specifies the amount of the output pixel's color error to diffuse to neighoring pixels, and wherein the dithering level can specify that less than the total amount of the output pixel's color error is diffused to neighboring pixels; and calculating a color error to diffuse to neighboring pixels in the output image from the target color, the paint color, and the dithering level.

2. The method of claim 1, wherein the accumulated color error received by the output image pixel from the plurality of neighboring pixels represents the sum of the color errors that have been diffused to the current output pixel by the dithering algorithm.

3. The method of claim 1, wherein the color error diffused to the neighboring pixels in the output image is a percentage of the difference between the output image pixel's target and paint colors, wherein the percentage is determined by the dithering level received from the corresponding pixel in the dithering mask.

4. The method of claim 1, wherein calculating a target color for the output image pixel comprises adding the accumulated color error received from the plurality of neighboring pixels to the true color of the corresponding pixel in the source image.

5. A computer program product configured to generate an output image with a limited color palette from a source image, the computer program product comprising instructions operable to cause a computer program to:

receive a true color for a pixel in the output image from a corresponding pixel in the source image;

receive an accumulated color error for the pixel in the output image from a plurality of neighboring pixels;

calculate a target color for the output image pixel from the true color and the accumulated color error;

find a paint color in the limited color palette, wherein the paint color is the color in the limited color palette that is closest to the target color;

paint the pixel in the output image with the paint color;

receive a dithering level from a corresponding pixel in a dithering mask associated with the source image, wherein the dithering level specifies the amount of the output pixel's color error to diffuse to neighboring pixels, and when the dithering level can specify that less than the total amount of the output pixel's color error is diffused to neighboring pixels; and calculate a color error to diffuse to neighboring pixels in the output image from the target color, the paint color, and the dithering level.

6. The computer program product of claim 5, wherein the accumulated color error received by the output image pixel from the plurality of neighboring pixels represents the sum of the color errors that have been diffused to the current output pixel by the dithering algorithm.

7. The computer program product of claim 5, wherein the color error diffused to the neighboring pixels in the output image is a percentage of the difference between the output image pixel's target and paint colors, wherein the percentage is determined by the dithering level received from the corresponding pixel in the dithering mask.

8. The computer program product of claim 5, wherein the instructions operable to cause the programmable processor to calculate a target color for the output image pixel comprises instructions operable to cause the programmable processor to add the accumulated color error received from the plurality of neighboring pixels to the true color of the corresponding pixel in the source image.

* * * * *

UNITED STATES PATENT AND TRADEMARK OFFICE
CERTIFICATE OF CORRECTION

PATENT NO. : 6,844,882 B1  
DATED : January 18, 2005  
INVENTOR(S) : Jon D. Clauson It is certified that error appears in the above-identified patent and that said Letters Patent is hereby corrected as shown below:

Column 7,  
Line 18, delete "neighoring" and insert -- neighboring --;

Column 8,  
Line 17, delete "when" and insert -- wherein --.

Signed and Sealed this

Third Day of May, 2005

JON W. DUDAS  
*Director of the United States Patent and Trademark Office*